(12) United States Patent
Byun et al.

(10) Patent No.: US 9,120,375 B2
(45) Date of Patent: Sep. 1, 2015

(54) SUDDEN ACCELERATION PREVENTING ELECTRONIC ACCELERATOR PEDAL AND METHOD THEREOF

(71) Applicant: KYUNG CHANG INDUSTRIAL CO., Ltd., Daegu (KR)

(72) Inventors: Sung-Il Byun, Daegu (KR); Jeong-Heon Lee, Daegu (KR); Dong-Jin Jeon, Daegu (KR)

(73) Assignee: KYUNG CHANG INDUSTRIAL CO., LTD., Daegu (KR)

( * ) Notice: Subject to any disclaimer, the term of this patent is extended or adjusted under 35 U.S.C. 154(b) by 0 days.

(21) Appl. No.: 14/280,344

(22) Filed: May 16, 2014

(65) Prior Publication Data
US 2014/0343814 A1 Nov. 20, 2014

(30) Foreign Application Priority Data

May 20, 2013 (KR) .......................... 10-2013-0056404
May 8, 2014 (KR) .......................... 10-2014-0054759

(51) Int. Cl.
*G06F 19/00* (2011.01)
*B60K 26/00* (2006.01)

(52) U.S. Cl.
CPC ..................... *B60K 26/00* (2013.01)

(58) Field of Classification Search
CPC .................... B60W 10/06; B60W 2540/0404; F02D 11/107; F02D 41/22
USPC .......... 701/70; 324/207.2, 207.25; 123/198 F, 123/399
See application file for complete search history.

(56) References Cited

U.S. PATENT DOCUMENTS

| 6,493,618 | B2 * | 12/2002 | Nada .......................... 701/30.9 |
| RE42,464 | E * | 6/2011 | Nada .......................... 701/30.6 |
| 7,957,856 | B2 * | 6/2011 | Itoh ............................ 701/22 |
| 2001/0029414 | A1 * | 10/2001 | Nada ............................ 701/34 |
| 2008/0025849 | A1 * | 1/2008 | Okamoto et al. .......... 417/213 |
| 2010/0004809 | A1 * | 1/2010 | Itoh ............................ 701/22 |
| 2012/0293124 | A1 * | 11/2012 | Hirai et al. ................. 320/112 |
| 2014/0129068 | A1 * | 5/2014 | Higa et al. ................... 701/22 |

FOREIGN PATENT DOCUMENTS

JP 07-246856 A 9/1995
KR 10-2004-0035984 A 4/2004

* cited by examiner

*Primary Examiner* — McDieunel Marc
(74) *Attorney, Agent, or Firm* — Fenwick & West LLP

(57) ABSTRACT

Embodiments relate to a pedal module including an accelerator pedal; a pedal sensing unit; a pedal monitoring unit; and a control unit. The pedal monitoring unit determines whether an accelerating state of a vehicle is in an abnormal sudden acceleration state using abnormal sudden acceleration determination information transmitted from the pedal sensing unit, and transmits an accelerator pedal output signal to the control unit. The accelerator pedal output signal is based on the rotation angle of the accelerator pedal when the accelerating state of the vehicle is not in the abnormal sudden accelerating state. The accelerator pedal output signal is a controlled accelerator pedal output signal when the accelerating state of the vehicle is in the abnormal sudden accelerating state. The control unit controls the vehicle according to the accelerator pedal output signal. The abnormal sudden acceleration determination information includes information on the force applied to the accelerator pedal.

18 Claims, 14 Drawing Sheets

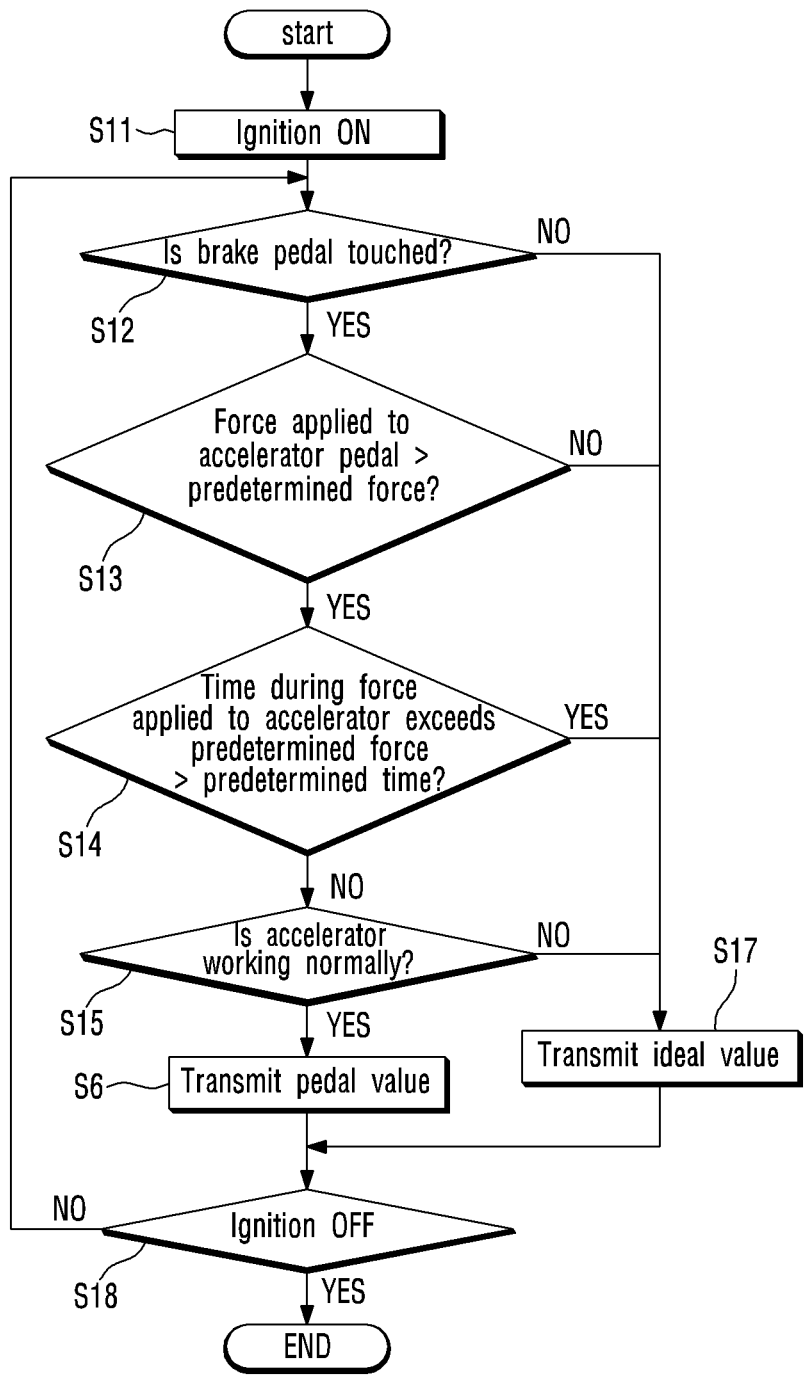

SUDDEN ACCELERATION PREVENTING ELECTRONIC ACCELERATOR PEDAL AND METHOD THEREOF

CROSS-REFERENCE TO RELATED APPLICATIONS

The present application claims priority under 35 U.S.C. §119(a) to Korean Patent Application No. 10-2013-0056404 filed on May 20, 2013 and Korean Patent Application No. 10-2014-0054759 filed on May 8, 2014, which are incorporated by reference herein in their entirety.

FIELD

The present invention relates to an electronic accelerator pedal, and more particularly to a sudden acceleration preventing electronic accelerator pedal.

DESCRIPTION OF RELATED ART

The present invention relates to a technology for a abnormal sudden accelerating state of a vehicle, and the abnormal sudden acceleration is occurred due to misoperation, malfunction, error in electronic system, and accidents related to such an abnormal sudden acceleration occurs all over the world and not limited to a particular country or brand.

To solve such an abnormal sudden acceleration, various safety devices including Brake Override System (BOS), Emergency Assist System (EAS), and smart brake have been developed and applied, and in April 2012, the U.S. Department of Transportation's National Highway Traffic Safety Administration (NHTSA) proposed to vehicle manufactures that a sudden acceleration preventing device should be installed to all the vehicles with a grace period of 2 year, and the legislation designed to install abnormal sudden acceleration preventing device to passenger cars and small trucks that have a weight 4.5 tons or less has been pushed.

Specifically, a conventional sudden acceleration prevention system as shown in FIG. 1 determines whether the accelerating state of a vehicle is an abnormal sudden accelerating state or not by using information on the operation of brake pedal and information on the rotation angle of accelerator pedal transmitted form sensing unit 1, and the determined information on the accelerating state of the vehicle is transmitted to Engine Control Unit (ECU) 4, and control unit 3 controls the vehicle by using the information communicated with ECU 4 through Controller Area Network (CAN) communication.

Such an abnormal sudden acceleration occurs due to various causes including misoperation of pedal, mechanical problem, malfunction, abnormal signal generation, and electromagnetic wave, and operation signals of pedal should be required to solve these problems, but dangerous situations occurred in various driving conditions have not been handled because the criteria for the determination of the intention of a driver depends only on the pressure on the brake pedal and the rotation angle of the accelerator pedal in the existing abnormal sudden acceleration prevention system.

Also, the abnormal sudden accelerating state is controlled only through ECU, the abnormal sudden accelerating state due to error or CAN communication with ECU or ECU itself cannot be handled.

Therefore, it is required to develop technology on analyzing intention of a driver and associating the intention of the driver to ECU for control of the vehicle in order to determine whether the accelerating state of the vehicle is the abnormal sudden accelerating state or not, and a state recognition technology and an intelligent pedal that can be applied to various abnormal sudden acceleration prevention system and can improve the safety of the vehicle.

SUMMARY

One aspect of the present invention is a pedal module that includes: an accelerator pedal; a pedal sensing unit comprising an accelerator pedal force sensor detecting a force applied to the accelerator pedal and an accelerator position sensor detecting a rotation angle of the accelerator pedal; a pedal monitoring unit; and a control unit. The pedal monitoring unit determines whether an accelerating state of a vehicle is an abnormal sudden acceleration state or not by using abnormal sudden acceleration determination information transmitted from the pedal sensing unit, and transmits an accelerator pedal output signal to the control unit in accordance with the accelerating state of the vehicle. The accelerator pedal output signal is an accelerator pedal output signal based on the rotation angle of the accelerator pedal transmitted from the pedal sensing unit when it is determined that the accelerating state of the vehicle is not the abnormal sudden accelerating state, wherein the accelerator pedal output signal is a controlled accelerator pedal output signal when it is determined that the accelerating state of the vehicle is the abnormal sudden accelerating state. The control unit controls the vehicle in accordance with the accelerator pedal output signal transmitted from the pedal monitoring unit. The abnormal sudden acceleration determination information comprises information on the force applied to the accelerator pedal.

The accelerator pedal comprises an accelerator pedal bracket, an accelerator pedal arm, and an accelerator pedal pad. The accelerator pedal force sensor comprises an accelerator pedal force detector disposed on one of the accelerator pedal arm and the accelerator pedal bracket and an accelerator pedal force transmitter disposed on the other of the accelerator pedal arm and the accelerator pedal bracket.

The accelerator pedal comprises an accelerator pedal bracket, an accelerator pedal arm, and an accelerator pedal pad. The accelerator pedal force sensor is a pressure sensitive proximity sensor or a pressure sensitive capacitive proximity sensor disposed on a surface of the accelerator pedal pad.

A warning signal is transmitted from the pedal monitoring unit to the control unit through CAN communication and is transmitted in the form of hard wire from the pedal monitoring unit to the control unit.

The controlled accelerator pedal output signal is an idle signal.

The accelerator pedal output signal is transmitted to the control unit without going through the ECU.

Another aspect of the present invention is a pedal module that includes: an accelerator pedal; a pedal sensing unit comprising an accelerator pedal touch sensor detecting touch on the accelerator pedal and an accelerator position sensor detecting a rotation angle of the accelerator pedal; a pedal monitoring unit; and a control unit. The pedal monitoring unit determines whether an accelerating state of a vehicle is an abnormal sudden acceleration state or not by using abnormal sudden acceleration determination information transmitted from the pedal sensing unit, and transmits an accelerator pedal output signal to the control unit in accordance with the accelerating state of the vehicle to the control unit. The accelerator pedal output signal is an accelerator pedal output signal based on the rotation angle of the accelerator pedal transmitted from the pedal sensing unit when it is determined that the accelerating state of the vehicle is not the abnormal sudden accelerating state, wherein the accelerator pedal output signal is a controlled accelerator pedal output signal when it is determined that the accelerating state of the vehicle is the abnormal sudden accelerating state. The control unit controls the vehicle in accordance with the accelerator pedal output signal transmitted from the pedal monitoring unit. The abnormal sudden acceleration determination information comprises information on the touch on the accelerator pedal.

The accelerator pedal comprises an accelerator pedal bracket, an accelerator pedal arm, and an accelerator pedal pad. The accelerator pedal touch sensor comprises a tact switch disposed on the accelerator pedal pad.

The abnormal sudden acceleration determination information further comprises at least one of engine RPM information, vehicle speed information, and information on an opening degree of a throttle valve, each of which is transmitted from a vehicle status sensing unit.

A warning signal is transmitted from the pedal monitoring unit to the control unit through CAN communication and is transmitted in the form of hard wire from the pedal monitoring unit to the control unit.

The controlled accelerator pedal output signal is an idle signal.

The accelerator pedal output signal is transmitted to the control unit without going through the ECU.

The pedal module further includes a brake pedal. The pedal sensing unit further comprises a brake pedal touch sensor detecting touch on the brake pedal or a brake position sensor detecting a rotation angle of the brake pedal. The abnormal sudden acceleration determination information further comprises information on the touch on the brake pedal or information on the rotation angle of the brake pedal.

Further another aspect of the present invention is method for controlling abnormal sudden acceleration of a vehicle that includes: determining that a driver is misoperating an accelerator pedal when a time during which a state where a value of a force which is applied to the accelerator pedal exceeds a predetermined value is maintained is greater than a predetermined reference time; and controlling an output of the accelerator pedal. When it is determined that the driver is misoperating the accelerator pedal, the controlling the output of the accelerator pedal is performed.

The method further includes determining that a driver is not stepping on the accelerator pedal when the value of the force which is applied to the accelerator pedal is less than a predetermined value. When it is determined that the driver is not stepping on the accelerator pedal, the controlling the output of the accelerator pedal is performed.

The method further includes determining whether the accelerator pedal is normally operating or not. When it is determined that the accelerator pedal is not normally operating, the controlling the output of the accelerator pedal is performed.

Further another aspect of the present invention is method for controlling abnormal sudden acceleration of a vehicle that includes: determining whether a driver is stepping on an accelerator pedal or not; determining the vehicle is accelerating when at least one of an engine RPM, a vehicle speed, and opening degree of a throttle valve increases; controlling an output of the accelerator pedal. The controlling the output of the accelerator pedal is performed when it is determined that the driver is not stepping on the accelerator pedal and it is determined that the vehicle is accelerating.

The method further includes determining whether the driver is stepping on a brake pedal or not. The controlling the output of the accelerator pedal is performed when it is determined that the driver is stepping on the brake pedal.

BRIEF DESCRIPTION OF THE DRAWINGS

FIG. 17 is a flow chart to show the abnormal sudden acceleration control method of the pedal module according to the second embodiment of the present invention;

DETAILED DESCRIPTION

Figure 1:
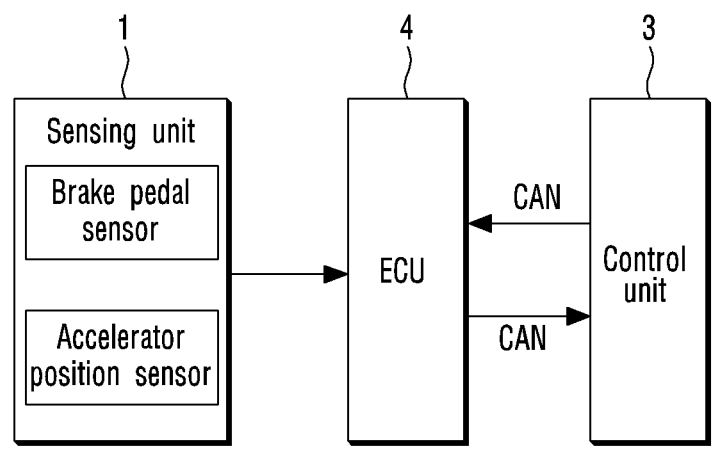
FIG. 1 is a block diagram of a conventional sudden acceleration prevention system.

The objects, particular advantages and novel features of the present invention will be more apparent from the following descriptions and exemplary embodiments which are related to the accompanying drawings. In the drawings, the same or similar elements are denoted by the same reference numerals even though they are depicted in different drawings. While terms such as the first and the second, etc., can be used to describe various components, the components are not limited by the terms mentioned above. The terms are used only for distinguishing between one component and other components. Throughout the description of the present invention, the detailed description of known technologies incorporated herein will be omitted when it may make the subject matter of the present invention unclear.

Figure 2:
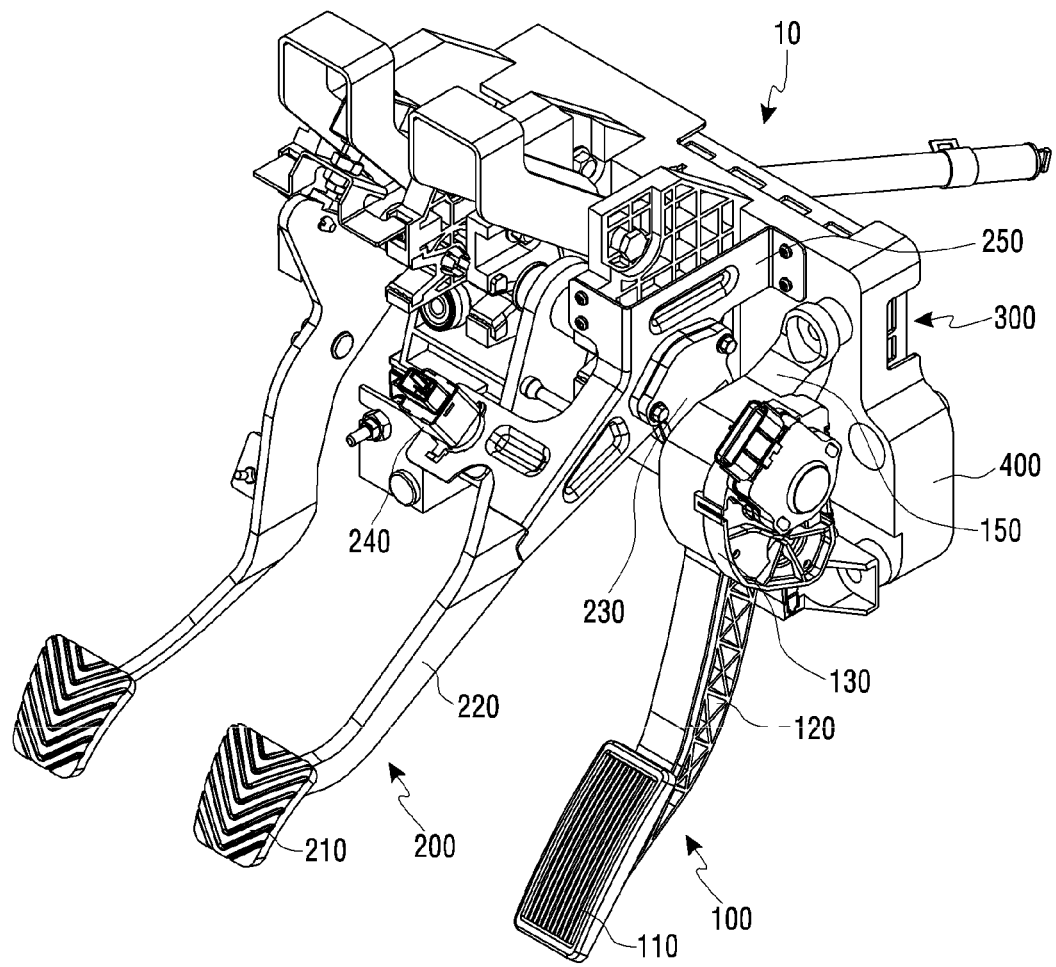
FIG. 2 is a perspective view of the pedal module according to the present invention.
Figure 3:
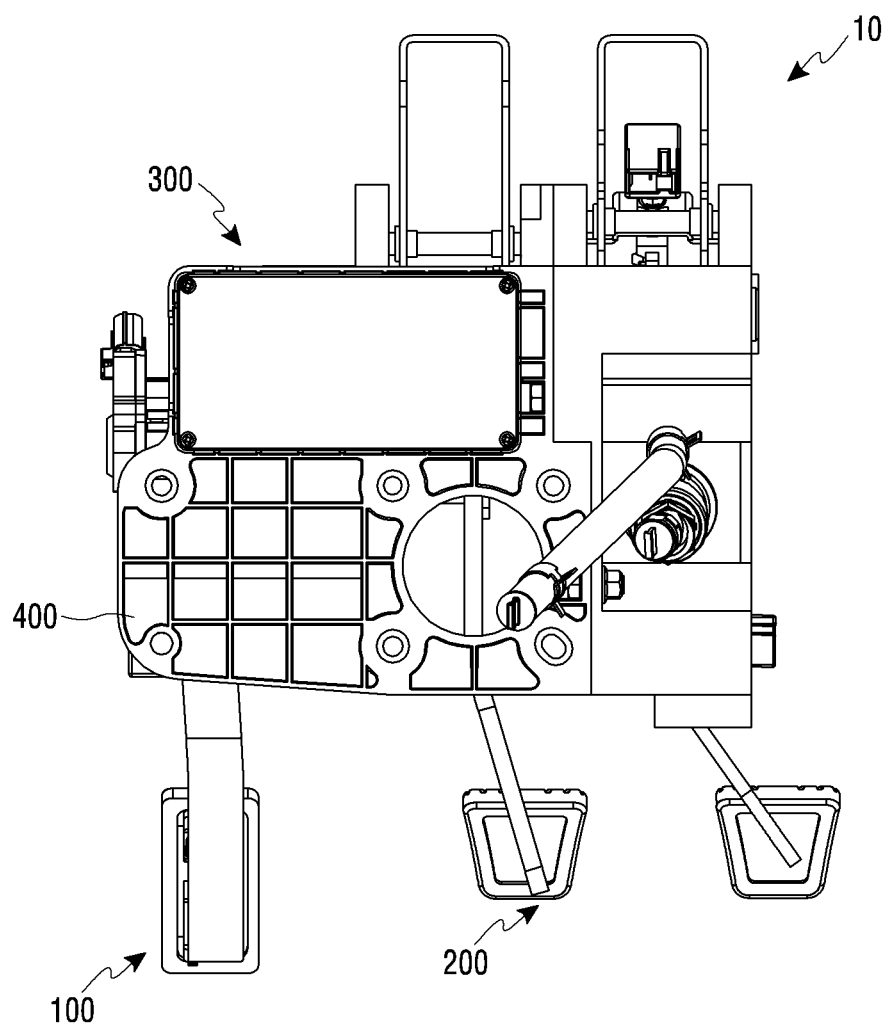
FIG. 3 is a rear view of the pedal module according to the present invention.

Hereafter, the exemplary embodiment of the present invention will be described with reference with the accompanying drawings. FIG. 2 is a perspective view of the pedal module according to the present invention. FIG. 3 is a rear view of the pedal module according to the present invention. As shown in FIG. 2, the pedal module 10 according to the present invention includes an accelerator pedal 100, a brake pedal 200, a pedal monitoring unit 300, and a pedal base 400.

Figure 4:
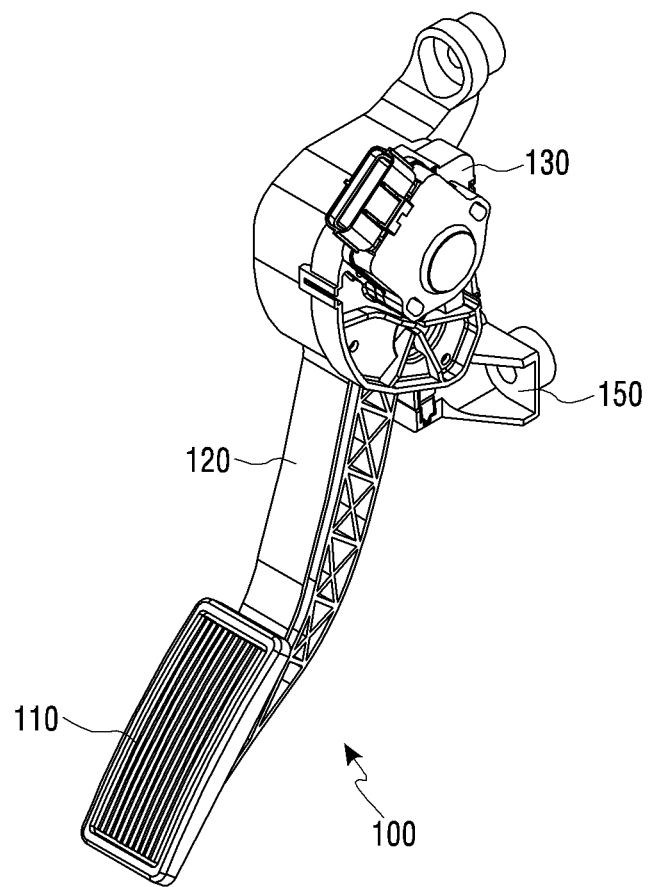
FIG. 4 is a perspective view of the accelerator pedal according to the present invention.
Figure 5:
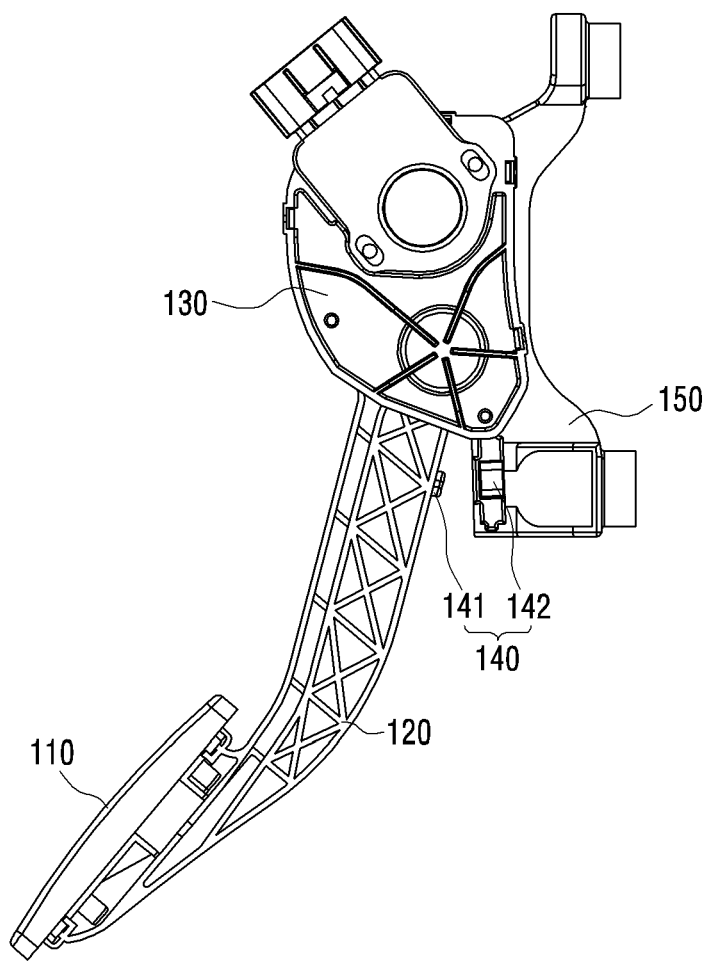
FIG. 5 is a right side view of the accelerator pedal when no force is applied to the accelerator pedal according to the present invention.
Figure 6:
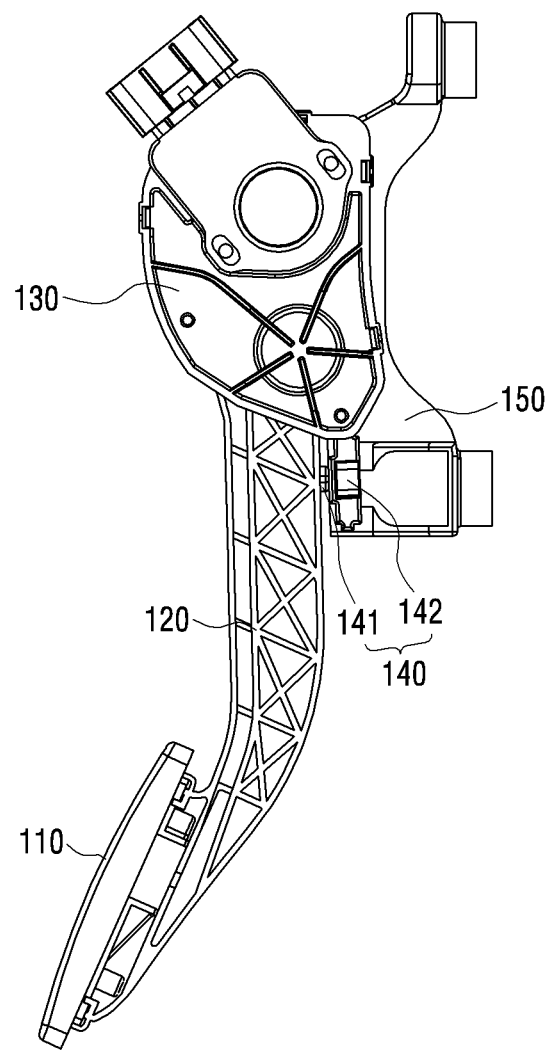
FIG. 6 is a right side view of the accelerator pedal when force is applied to the accelerator pedal according to the present invention.
Figure 7:
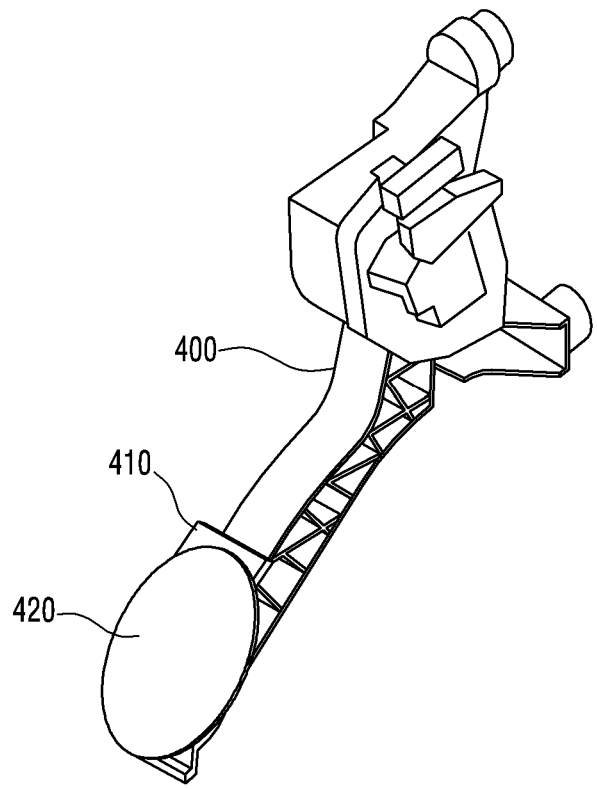
FIG. 7 is a perspective view of the accelerator pedal pad to show the disposition of the sensor according to the present invention.
Figure 8:
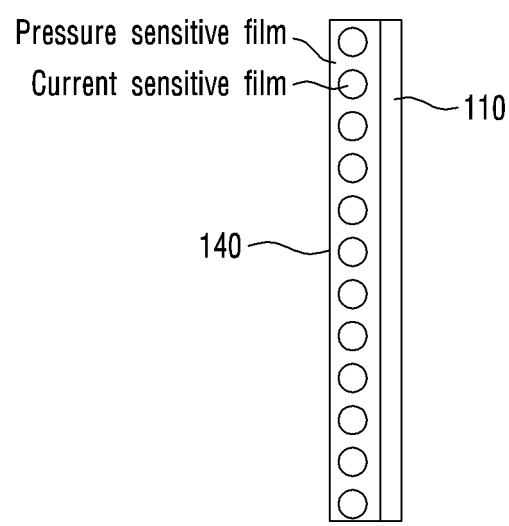
FIG. 8 is a cross sectional view enlarging the sensor disposed on the accelerator pedal pad according to the present invention.
Figure 9:
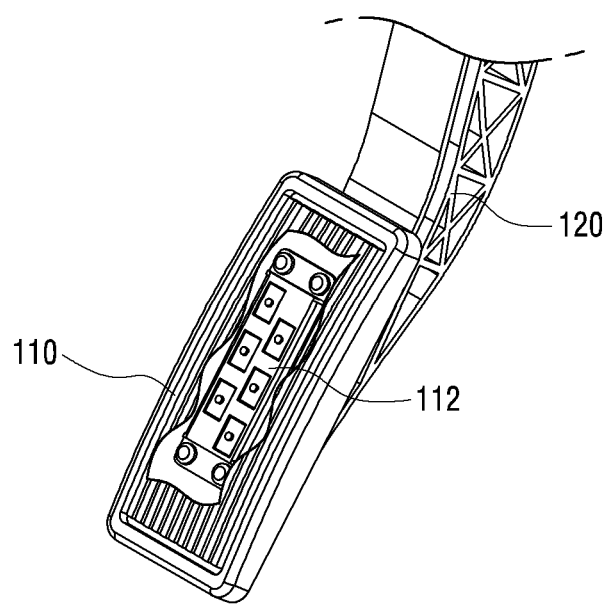
FIG. 9 is a perspective view of the accelerator pedal pad to show the disposition of the tact switch according to the present invention.
Figure 10:
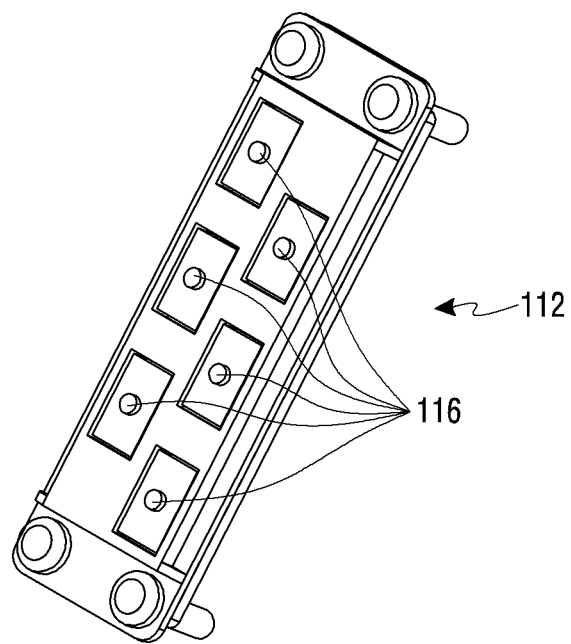
FIG. 10 is a perspective view of the tact switch according to the present invention.

Referring to FIGS. 4 to 10, the accelerator pedal 100 according to the present invention will be described. FIG. 4 is a perspective view of the accelerator pedal according to the present invention. FIG. 5 is a right side view of the accelerator pedal when no force is applied to the accelerator pedal according to the present invention. FIG. 6 is a right side view of the accelerator pedal when force is applied to the accelerator pedal according to the present invention. FIG. 7 is a perspective view of the accelerator pedal pad to show the disposition of the sensor according to the present invention. FIG. 8 is a cross sectional view enlarging the sensor disposed on the accelerator pedal pad according to the present invention. FIG. 9 is a perspective view of the accelerator pedal pad to show the disposition of the tact switch according to the present invention. FIG. 10 is a perspective view of the tact switch according to the present invention;

As shown in FIGS. 2 to 8, the accelerator pedal 100 according to the present invention may include an accelerator pedal pad 110, an accelerator pedal arm 120, and an accelerator position sensor 130, an accelerator pedal force sensor 140, and an accelerator pedal bracket 150.

The accelerator pedal bracket 150 is a part for installing the accelerator pedal 100 to vehicle, and may be installed to the pedal base 400 as shown in FIG. 2.

The accelerator pedal arm 120 may be installed to the accelerator pedal bracket 150, and may be rotated according to the rotation axis of the accelerator pedal 100.

As shown in FIGS. 5 and 6, Accelerator pedal force sensor 140 for detecting a force applied to the accelerator pedal may include an accelerator pedal force transmitter 141 disposed on the accelerator pedal arm 120 and an accelerator pedal force detector 142 disposed on the accelerator pedal bracket 150. As shown in FIG. 5, when no force is applied to the accelerator pedal 100, accelerator pedal force detector 142 cannot detect any force because the accelerator pedal force transmitter 141 is spaced apart from the accelerator pedal force detector 142. As a force is applied to the accelerator pedal 100, the accelerator pedal 100 rotates toward the pedal base 150, and as shown in FIG. 6, as the accelerator pedal 100 rotates to the pedal base 150, the accelerator pedal force transmitter 141 can transmit the force to the accelerator pedal force detector 142. In this way, the accelerator pedal force sensor 140 can detect the force applied to the accelerator pedal 100 because the accelerator pedal force detector 142 can detect the force transmitted by the accelerator pedal force transmitter 141. Although it is described that accelerator pedal force transmitter 141 is disposed on the accelerator pedal arm 120 and the accelerator pedal force detector 142 is disposed on the accelerator pedal bracket, there is no limit to this. The accelerator pedal force transmitter 141 may be disposed on the accelerator pedal bracket 150 and the accelerator pedal force detector 142 may be disposed on the accelerator pedal arm 120.

As shown in FIGS. 7 and 8, Accelerator pedal force sensor 140 for detecting a force applied to the accelerator pedal 100 may be disposed on the surface of the accelerator pedal pad 110, said accelerator pedal force sensor 140 may be a weight sensor which is a kind of a sensor applied to a scale, or may be a pressure sensitive proximity sensor or a pressure sensitive capacitive proximity sensor.

As shown in FIGS. 2 to 6, the accelerator position sensor 130 may be installed to the accelerator pedal bracket 150. The accelerator position sensor 130 detects the rotation angle of the accelerator pedal 100 as a force is applied to the accelerator pedal 100.

The accelerator pedal pad 110 is a part for receiving a force applied to the accelerator pedal 100 by a driver, and may be disposed on the end portion of the accelerator pedal arm 120.

As shown in FIGS. 9 and 10, an accelerator pedal touch sensor 112 may be disposed on the accelerator pedal pad 110, and may consist of a plurality of tact switches 116 that is on when the accelerator pedal pad 110 is touched by a foot of a driver, and is off when the foot of the driver is spaced apart from the accelerator pedal pad 110. In this way, the accelerator pedal touch sensor 112 can detect touch on the accelerator pedal 100 because the tact switches 116 can detect the touch on the accelerator pedal pad 110.

Figure 11:
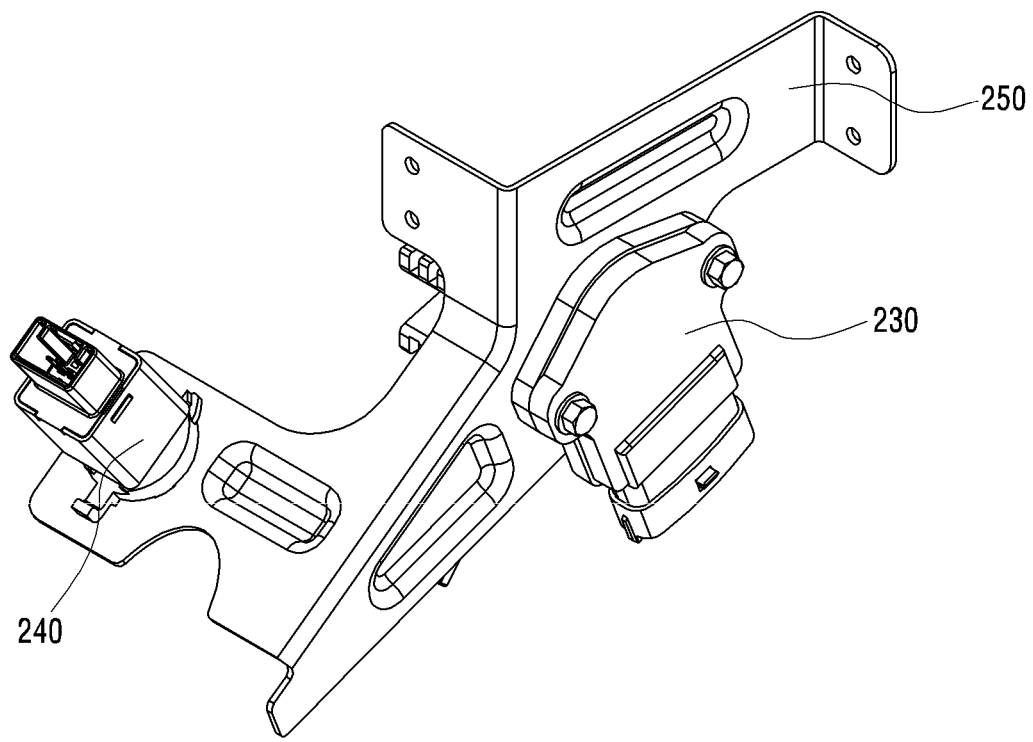
FIG. 11 is a perspective view showing the connection of the brake pedal touch sensor and the brake position sensor according to the present invention.

Referring to FIGS. 2 and 11, the brake pedal 200 according to the present invention will be described. FIG. 11 is a perspective view showing the connection of the brake pedal touch sensor and the brake position sensor according to the present invention.

As shown in FIG. 2, the brake pedal 200 according to the present invention may include a brake pedal pad 210, a brake pedal arm 220, a brake position sensor 230, a brake pedal touch sensor 240, and a brake pedal bracket 250.

The brake pedal bracket 250 is a part for installing the brake pedal 200 to vehicle, and may be installed to the pedal base 400.

The brake pedal arm 220 may be installed to the brake pedal bracket 250, and may be rotated according to the rotation axis of the brake pedal 200.

The brake position sensor 230 may be installed to the brake pedal bracket 250. The brake position sensor 230 detects the rotation angle of the brake pedal 200 as a force is applied to the brake pedal 200.

The brake pedal pad 210 is a part for receiving a force applied to the brake pedal 200 by a drive, and may be disposed on the end portion of the brake pedal arm 220.

As shown in FIG. 11, the brake pedal touch sensor 240 for detecting touch on the brake pedal 200 may include a brake pedal touch switch 242 disposed on the brake pedal bracket 250. The brake pedal touch switch 242 may be off when no force is applied to the brake pedal 200, and may be on when a force is applied to the brake pedal 200. In this way, the brake pedal touch sensor 240 can detect touch on the brake pedal 200 because the brake pedal touch switch 242 can detect the touch on the brake pedal arm 220.

Figure 12:
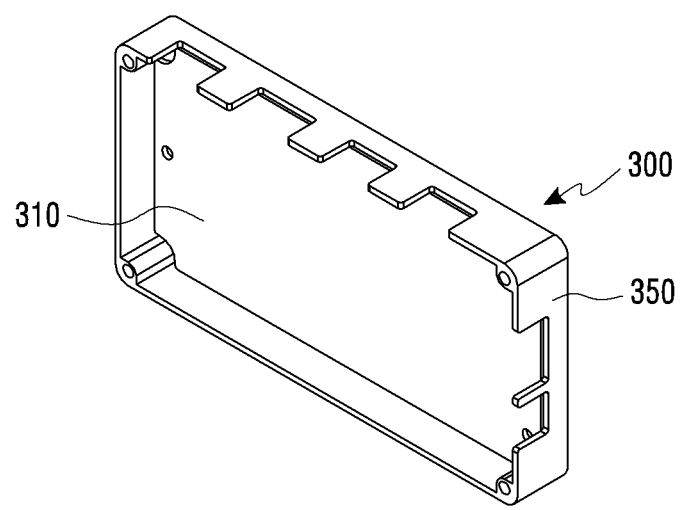
FIG. 12 is a perspective view of the pedal monitoring unit according to the present invention.
Figure 13:
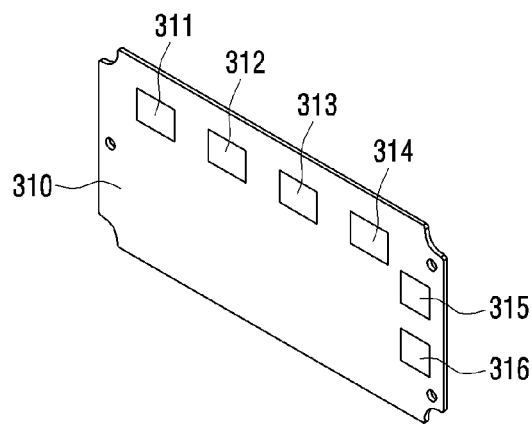
FIG. 13 is a perspective view of the pedal monitoring unit board according to the present invention.
Figure 14:
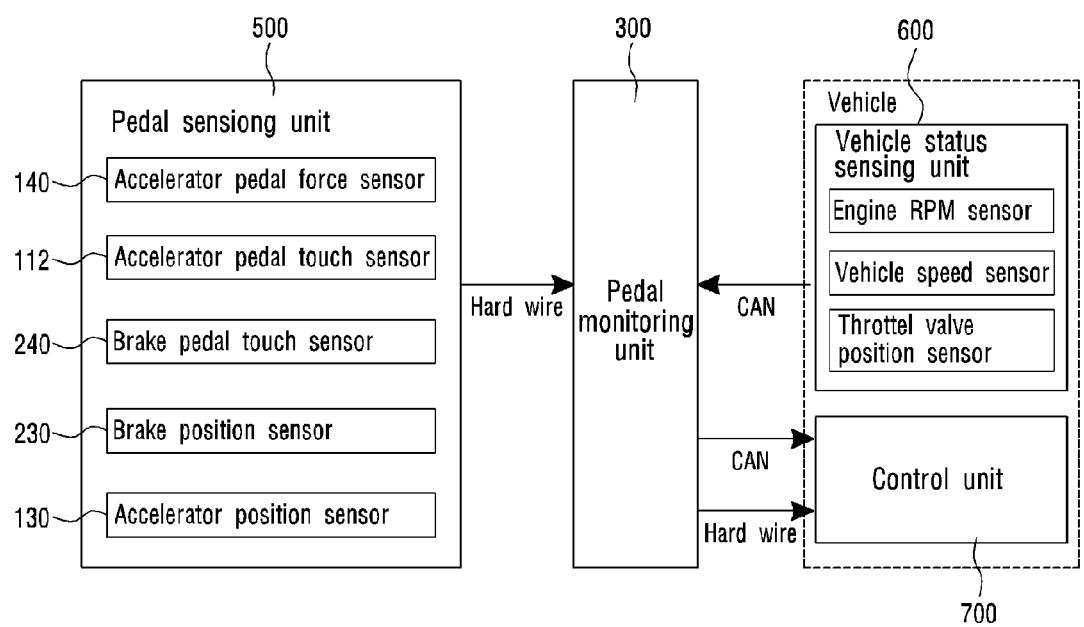
FIG. 14 is a block diagram to show the operation of the pedal monitoring unit board according to the first embodiment of the present invention.
Figure 15:
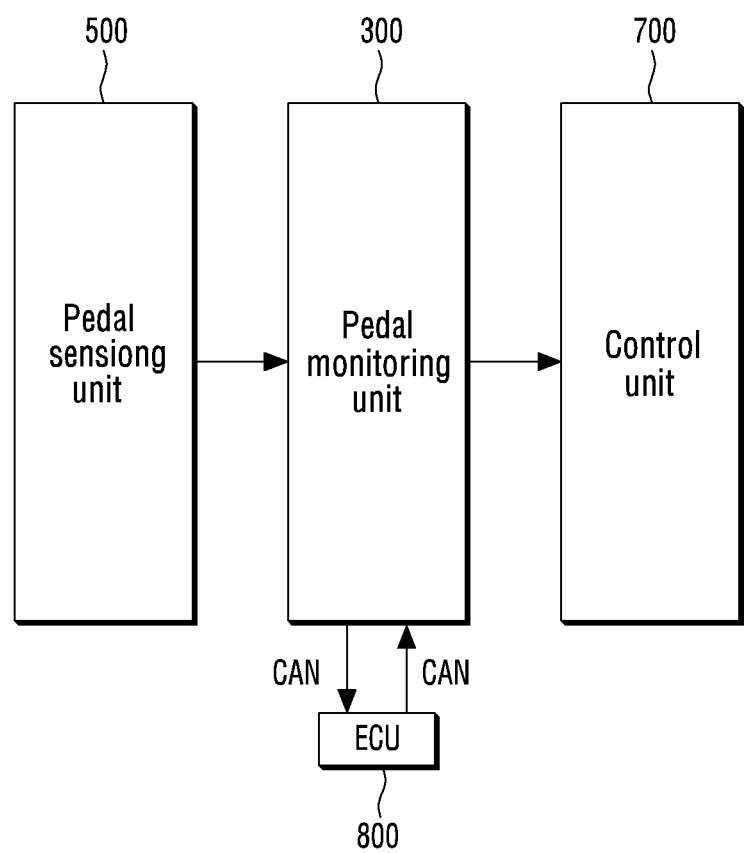
FIG. 15 is a block diagram to show the operation of the pedal monitoring unit board according to the second embodiment of the present invention.

Referring to FIGS. 1 and 12 to 15, the pedal monitoring unit 300 according to the present invention will be described. FIG. 12 is a perspective view of the pedal monitoring unit according to the present invention. FIG. 13 is a perspective view of the pedal monitoring unit board according to the present invention. FIG. 14 is a block diagram to show the operation of the pedal monitoring unit board according to the first embodiment of the present invention. FIG. 15 is a block diagram to show the operation of the pedal monitoring unit board according to the second embodiment of the present invention.

As shown in FIG. 14, an abnormal sudden acceleration determination information may be transmitted from a pedal sensing unit 500 for detecting the abnormal sudden acceleration determination information of the accelerator pedal 100 and/or brake pedal 200 to the pedal monitoring unit 300, and the pedal monitoring unit 300 may determine whether the accelerating state of a vehicle is an abnormal sudden accelerating state or not by using the abnormal sudden acceleration determination information transmitted from the pedal sensing unit 500, and may transmit an accelerator pedal output signal based on the accelerating state of the vehicle to a control unit 700. Here, the control unit 700 may control the vehicle in accordance with the accelerator pedal output signal transmitted from the pedal sensing unit 500, and may include ECU (Engine Control Unit).

Here, pedal sensing unit 500 may include the brake position sensor 230, the brake pedal touch sensor 240, the accelerator position sensor 130, the accelerator pedal touch sensor 112, and the accelerator pedal force sensor, and the abnormal sudden acceleration information may include the information on the rotation angle of the brake pedal detected by the brake position sensor 230, the information on the touch on the brake pedal detected by the brake pedal touch sensor 240, the information on the rotation angle of the accelerator pedal detected by the accelerator position sensor 130, the information on the touch on the accelerator pedal detected by the accelerator pedal touch sensor 112, and the information on the force applied to the accelerator pedal detected by the accelerator pedal force sensor 140.

Also, the abnormal sudden acceleration determination information may be further transmitted from a vehicle status sensing unit 600 to the pedal monitoring unit 300, the abnormal sudden acceleration determination information may further include engine RPM information, vehicle speed information and/or information on the opening degree of the throttle valve detected by the vehicle status sensing unit 600.

Here, pedal monitoring unit 300 may transmit an accelerator pedal output signal based on the rotation angle of the accelerator pedal 100 transmitted from the pedal sensing unit 500 to the control unit 700 when it is determined that the accelerating state of the vehicle is not the abnormal sudden accelerating state, and pedal monitoring unit 300 may transmit a controlled accelerator pedal output signal to control unit 700 when it is determined that the accelerating state of the vehicle is the abnormal sudden accelerating state. The accelerator pedal output signal may have an analog value from 0V to 5V in accordance with the rotation angle of the accelerator pedal 100, and the controlled accelerator pedal output signal may be an idle signal.

Also, pedal monitoring unit 300 may transmit a warning signal to the control unit 700 when it is determined that the accelerating state of the vehicle is the abnormal sudden accelerating state.

Here, as shown in FIG. 15, pedal monitoring unit 300 may transmit the accelerator pedal output signal and/or the warning signal to the control unit 700 and ECU 800 when it is determined that the accelerating state of the vehicle is the abnormal sudden accelerating state. In this way, the vehicle can be effectively controlled even in abnormal sudden accelerating state caused by an error of the CAN communication with ECU or ECU itself by providing another route to control the vehicle directly without going through ECU in addition to the route to control the vehicle through ECU.

As shown in FIG. 12, the pedal monitoring unit 300 according to the present invention may include a pedal monitoring unit board 310 and a pedal monitoring unit cover 350.

The pedal monitoring unit board cover 350 is a part for accommodating the pedal monitoring unit board 310, and may be installed to the pedal base 400 as shown in FIG. 2.

As shown in FIG. 13, the pedal monitoring unit board 310 may include a brake pedal rotation angle information input port 311, a brake pedal touch information input port 312, an accelerator pedal rotation angle information output port 313, an accelerator pedal rotation angle information input port 314, accelerator pedal touch information input port 315, and an accelerator pedal force information input port 316.

The information detected by the brake position sensor 230 may be transmitted in the form of hard wire signal to the brake pedal rotation angle information input port 311, so the information on the rotation angle of the brake pedal 200 detected by the brake position sensor 230 may be transmitted to the pedal monitoring unit 300 through the brake pedal rotation angle information input port 311.

The information detected by the brake pedal touch sensor 240 may be transmitted in the form of hard wire signal to the brake pedal touch information input port 312, so the information on the touch on the brake pedal 200 detected by the brake pedal touch sensor 240 may be transmitted to the pedal monitoring unit 300 through the brake pedal touch information input port 312.

The accelerator pedal output signal may be transmitted in the form of hard wire signal to the control unit 700, so the accelerator pedal output signal may be transmitted to the control unit 700 through the accelerator pedal rotation angle information output port 313.

The information detected by the accelerator position sensor 130 may be transmitted in the form of hard wire signal to the accelerator pedal rotation angle information input port 314, so the information on the rotation angle of the accelerator pedal 100 detected by the accelerator position sensor 130 may be transmitted to the pedal monitoring unit 300 through the accelerator pedal rotation angle information input port 314.

The information detected by the accelerator pedal touch sensor 112 may be transmitted in the form of hard wire signal to the accelerator pedal touch information input port 315, so the information on the touch of the accelerator pedal 100 detected by the accelerator pedal touch sensor 112 may be transmitted to the pedal monitoring unit 300 through the accelerator pedal touch information input port 315.

The information detected by the accelerator pedal force sensor 140 may be transmitted in the form of hard wire signal to the accelerator pedal force information input port 316, so the information on the force applied to the accelerator pedal 100 detected by the accelerator pedal force sensor 140 may be transmitted to the pedal monitoring unit 300 through the accelerator pedal force information input port 316.

The brake pedal touch information input port 312 and the vehicle status sensing unit 600 may be communicated through CAN communication, and engine RPM information, vehicle speed information and/or information on the opening degree of the throttle valve detected by the vehicle status sensing unit 600 may transmitted to the pedal monitoring unit 300 through the brake pedal touch information input port 312. Also, the brake pedal touch information input port 312 and the control unit 700 may be communicated through CAN communication, Also, information may transmitted in the form of hard wire signal to the control unit 700 through brake pedal touch information input port 312. The warning signal may be transmitted to the control unit 700 through the brake pedal touch information input port 312 through CAN communication, and/or in the form of hard wire signal when it is determined that the accelerating state of the vehicle is the abnormal sudden accelerating state. Here, it is desirable that the warning signal is transmitted to the control unit 700 both through CAN communication and in the form of hard wire signal because the warning signal may not properly transmitted to the control unit 700 due to an error of the CAN communication or transmission in the form of hard wire signal.

Figure 16:
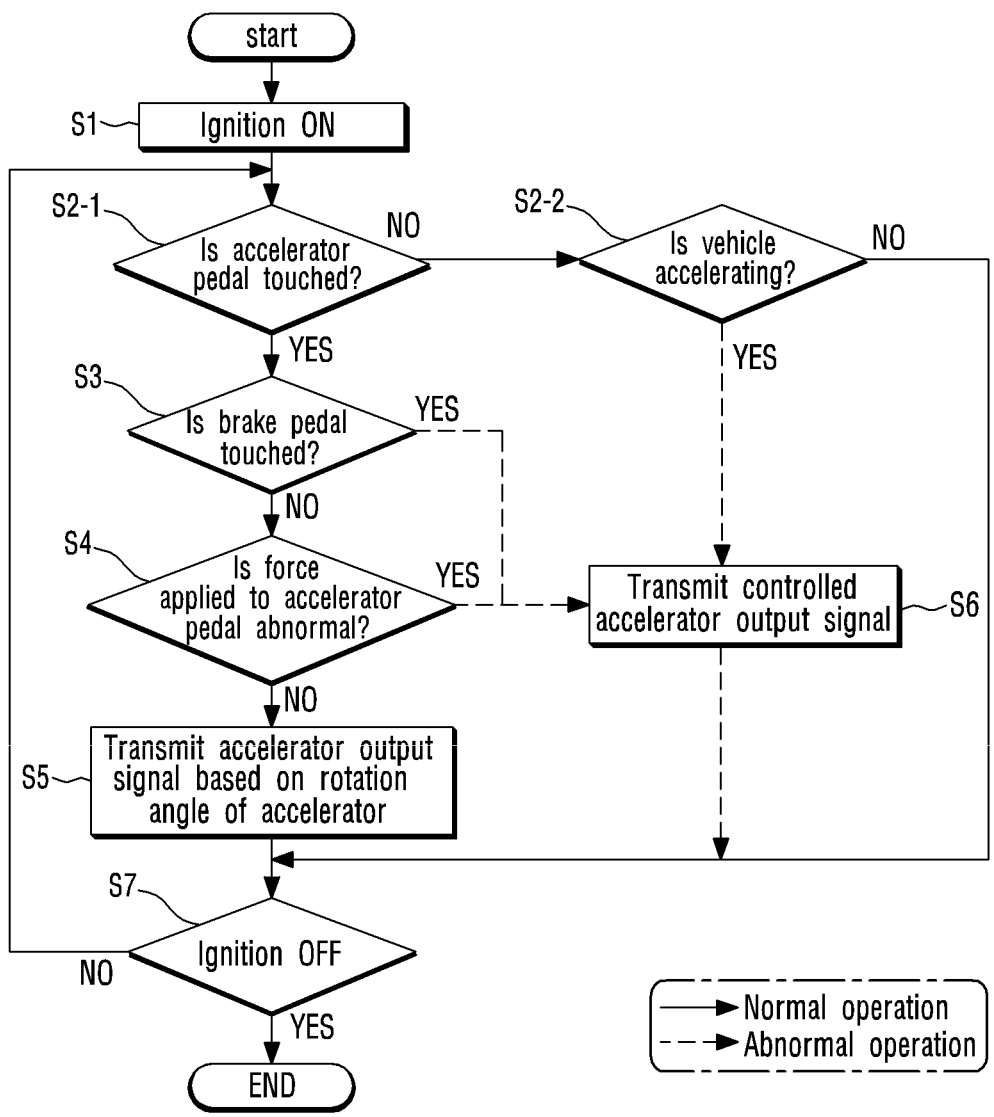
FIG. 16 is a flow chart to show the abnormal sudden acceleration control method of the pedal module according to the first embodiment of the present invention.

FIG. 16 is a flow chart to show the abnormal sudden acceleration control method that pedal monitoring unit determines whether the accelerating state of a vehicle is the abnormal sudden accelerating state or not by using the abnormal sudden acceleration determination information transmitted from the pedal sensing unit of the pedal module according to the first embodiment of the present invention;

The abnormal sudden accelerating state may includes a state that the vehicle is accelerating when the driver is not stepping on the accelerator pedal, a state that the driver is stepping on the brake pedal, and/or a state that the driver is misoperating the accelerator pedal by mistaking the brake pedal for the accelerator pedal.

When ignition is turned on, power of 12V is provided to the pedal monitoring unit board 310 and the operation of the pedal monitoring unit is started (S1).

It is determined whether a driver is stepping on the accelerator pedal 100 or not by using the information on the touch on the accelerator pedal 100 transmitted from the accelerator pedal touch sensor 112 (S2-1).

It is determined that the driver is stepping on the accelerator pedal when the time during which a state where at least one of tact switches 116 of the accelerator pedal touch sensor 112 is maintained on is greater than a predetermined reference time. Here, the predetermined reference time may be 50 millisecond.

Here, in the step of determining whether a drive is stepping on the accelerator pedal 100 or not, it may be determined whether a driver is stepping on the accelerator pedal or not by using the information on the force applied to the accelerator pedal 100 transmitted from the accelerator pedal force sensor 140.

It is determined that the drive is not stepping on the accelerator pedal 100 when the value of the force applied to the accelerator pedal 100 is less than a predetermined value. Here, the predetermined value of the force may be 2 N.

When it is determined that the drive is not stepping on the accelerator pedal 100, it is determined whether the vehicle is accelerating or not (S2-2).

It is determined whether the vehicle is accelerating or not by using the engine RPM information, the vehicle speed information, and/or the information on the opening degree of the throttle valve transmitted from the vehicle status sensing unit 600.

It is determined that the vehicle is accelerating when at least one of the engine RPM, the vehicle speed, and opening degree of the throttle valve increases.

When it is determined that the vehicle is accelerating, the controlled accelerator pedal output signal is transmitted to control unit 700 (S6) because it is assumed that the vehicle is accelerating even though the driver is not stepping on the accelerator pedal and the accelerator pedal is malfunctioning.

When it is determined that the drive is stepping on the accelerator pedal 100, it is determined whether the driver is stepping on the brake pedal 200 or not (S3).

It is determined whether a driver is stepping on the brake pedal 200 or not by using the information on the touch on the brake pedal 200 transmitted from the brake pedal touch sensor 240 and/or the information on the rotation angle of the brake pedal 200 transmitted from the brake position sensor 230.

It is determined that the driver is stepping on the brake pedal when the time during which a state where the brake pedal touch switch 242 of the brake pedal touch sensor 240 is maintained on is greater than a predetermined reference time or when the time during which a state where the brake pedal 240 is maintained rotated is greater than a predetermined reference time. Here, the predetermined reference time may be 50 millisecond.

When it is determined that the driver is stepping on the brake pedal 200, the controlled accelerator pedal output signal is transmitted to control unit 700 (S6) because it is assumed that the driver is stepping on both accelerator pedal and brake pedal simultaneously and the accelerating state of the vehicle is not intended by the driver.

When it is determined that the driver is not stepping on the brake pedal 200, it is determined whether the driver is misoperating the accelerator pedal 100 or not (S4).

It is determined whether the driver is misoperating the accelerator pedal 100 or not by using the information on the force applied to the accelerator pedal 100 transmitted from the accelerator pedal force sensor 140.

When the time during which a state where a value of the force which is applied to the accelerator pedal exceeds a predetermined value is maintained is greater than a predetermined reference time, the controlled accelerator pedal output signal is transmitted to control unit 700 (S6) because it is assumed that the driver is misoperating the accelerator pedal by mistaking the brake pedal for the accelerator pedal.

Here, the predetermined value of the force may be 50 N, and the predetermined reference time may be 50 millisecond.

When the time during which a state where a value of the force which is applied to the accelerator pedal exceeds a predetermined value is maintained is not greater than a predetermined reference time, the accelerator pedal output signal based on the rotation angle of the accelerator pedal 100 transmitted from the pedal sensing unit 500 to the control unit 700 (S5) because it is assumed that the accelerating state of the vehicle is not the abnormal sudden accelerating.

When ignition is turned off, the operation of the pedal monitoring unit is terminated (S7).

FIG. 17 is a flow chart to show the abnormal sudden acceleration control method that pedal monitoring unit determines whether the accelerating state of a vehicle is the abnormal sudden accelerating state or not by using the abnormal sudden acceleration determination information transmitted from the pedal sensing unit of the pedal module according to the second embodiment of the present invention;

The abnormal sudden accelerating state may includes a state that the driver is stepping on the brake pedal, a state that the driver is not stepping on the accelerator pedal, a state that the driver is misoperating the accelerator pedal by mistaking the brake pedal for the accelerator pedal and/or a state that the accelerator pedal is malfunctioning.

When ignition is turned on, power of 12V is provided to the pedal monitoring unit board 310 and the operation of the pedal monitoring unit is started (S11).

It is determined whether the driver is stepping on the brake pedal 200 or not (S12).

When it is determined that the driver is stepping on the brake pedal 200, the controlled accelerator pedal output signal is transmitted to control unit 700 (S17) because it is assumed that the accelerating state of the vehicle is not the normal acceleration.

When it is determined that the driver is not stepping on the brake pedal 200, it is determined whether a driver is stepping on the accelerator pedal 100 or not (S13).

It is determined whether a driver is stepping on the accelerator pedal 100 or not by using the information on the force applied to the accelerator pedal 100 transmitted from the accelerator pedal force sensor 140.

It is determined that the drive is not stepping on the accelerator pedal 100 when the value of the force applied to the accelerator pedal 100 is less than a predetermined value. Here, the predetermined value of the force may be 2 N.

When it is determined that the drive is not stepping on the accelerator pedal 100, the controlled accelerator pedal output signal is transmitted to control unit 700 (S17) because it is assumed that the accelerating state of the vehicle is not the normal acceleration.

When it is determined that the drive is stepping on the accelerator pedal 100, it is determined whether the driver is misoperating the accelerator pedal 100 or not (S14).

It is determined whether the driver is misoperating the accelerator pedal 100 or not by using the information on the force applied to the accelerator pedal 100 transmitted from the accelerator pedal force sensor 140.

When the time during which a state where a value of the force which is applied to the accelerator pedal exceeds a predetermined value is maintained is greater than a predetermined reference time, the controlled accelerator pedal output signal is transmitted to control unit 700 (S17) because it is assumed that the driver is misoperating the accelerator pedal by mistaking the brake pedal for the accelerator pedal.

Here, the predetermined value of the force may be 50 N, and the predetermined reference time may be 50 millisecond.

When the time during which a state where a value of the force which is applied to the accelerator pedal exceeds a predetermined value is maintained is not greater than a predetermined reference time, it is determined whether the accelerator pedal is normally working or not by using the information on the operation of the accelerator pedal transmitted from a accelerator pedal operation sensor (not shown) (S15).

When it is determined that the accelerator pedal is not normally working, the controlled accelerator pedal output signal is transmitted to control unit 700 (S17) because it is assumed that the accelerating state of the vehicle is not the normal acceleration.

When it is determined that the accelerator pedal is normally working, the accelerator pedal output signal based on the rotation angle of the accelerator pedal 100 transmitted from the pedal sensing unit 500 to the control unit 700 (S16) because it is assumed that the accelerating state of the vehicle is not the abnormal sudden accelerating.

When ignition is turned off, the operation of the pedal monitoring unit is terminated (S8).

The abnormal sudden acceleration occurred due to various causes including misoperation of pedal, mechanical problem, malfunction, abnormal signal generation, and electromagnetic wave can be effectively handled by controlling vehicle in such an abnormal sudden acceleration through analyzing intention of the driver by using touch on the accelerator pedal, force applied to the accelerator pedal, touch on the brake pedal, engine RPM, vehicle speed, and/or opening degree of throttle valve besides pressure on the brake pedal and the rotation angle of the accelerator pedal.

The features, structures and effects and the like described in the embodiments are included in at least one embodiment of the present invention and are not necessarily limited to one embodiment. Furthermore, the features, structures, effects and the like provided in each embodiment can be combined or modified in other embodiments by those skilled in the art to which the embodiments belong. Therefore, contents related to the combination and modification should be construed to be included in the scope of the present invention.

Although the embodiments of the present invention were described above, these are just examples and do not limit the present invention. Further, the present invention may be changed and modified in various ways, without departing from the essential features of the present invention, by those skilled in the art. That is, the components described in detail in the embodiments of the present invention may be modified. Further, differences due to the modification and application should be construed as being included in the scope and spirit of the present invention, which is described in the accompanying claims.

What is claimed is:
1. A pedal module comprising:
an accelerator pedal;
a pedal sensing unit comprising an accelerator pedal force sensor detecting a force applied to the accelerator pedal and an accelerator position sensor detecting a rotation angle of the accelerator pedal;
a pedal monitoring unit; and
a control unit;
wherein the control unit controls the vehicle in accordance with a controlled accelerator pedal output signal or an accelerator pedal output signal based on the rotation angle of the accelerator pedal transmitted from the pedal monitoring unit, and
wherein the pedal monitoring unit receives the rotation angle of the accelerator pedal from the accelerator pedal position sensor and the force applied to the accelerator pedal from the accelerator pedal force sensor, the pedal monitoring unit transmitting the controlled accelerator pedal output signal to the control unit if a time during which the force applied to the accelerator pedal exceeds a predetermined value is longer than a predetermined reference time, the pedal monitoring unit transmitting the accelerator pedal output signal to the control unit if the time during which the force applied to the accelerator pedal exceeds the predetermined value is not longer than the predetermined reference time.

2. The pedal module of claim 1,
wherein the accelerator pedal comprises an accelerator pedal bracket, an accelerator pedal arm, and an accelerator pedal pad, and
wherein the accelerator pedal force sensor comprises an accelerator pedal force detector disposed on one of the accelerator pedal arm and the accelerator pedal bracket and an accelerator pedal force transmitter disposed on the other of the accelerator pedal arm and the accelerator pedal bracket.

3. The pedal module of claim 1,
wherein the accelerator pedal comprises an accelerator pedal bracket, an accelerator pedal arm, and an accelerator pedal pad, and
wherein the accelerator pedal force sensor is a pressure sensitive proximity sensor or a pressure sensitive capacitive proximity sensor disposed on a surface of the accelerator pedal pad.

4. The pedal module of claim 1,
wherein a warning signal is transmitted from the pedal monitoring unit to the control unit through a controlled area network (CAN) communication and is transmitted through hard wire from the pedal monitoring unit to the control unit if the time during which the force applied to the accelerator pedal exceeds the predetermined value is longer than the predetermined reference time.

5. The pedal module of claim 1,
wherein the controlled accelerator pedal output signal is an idle signal.

6. The pedal module of claim 1,
wherein the accelerator pedal output signal is transmitted to the control unit without going through an engine control unit (ECU).

7. A pedal module comprising:
an accelerator pedal;

a pedal sensing unit comprising an accelerator pedal touch sensor detecting touch on the accelerator pedal and an accelerator position sensor detecting a rotation angle of the accelerator pedal;
a vehicle status sensing unit;
a pedal monitoring unit; and
a control unit;
wherein the control unit controls the vehicle in accordance with a controlled accelerator pedal output signal or an accelerator pedal output signal based on the rotation angle of the accelerator pedal transmitted from the pedal monitoring unit, and
wherein the pedal monitoring unit receives the rotation angle of the accelerator pedal from the accelerator pedal position sensor, information on touching of the accelerator pedal from the accelerator pedal touch sensor, and at least one of an engine rotation speed, a vehicle speed, and a degree of opening of a throttle valve, the pedal monitoring unit transmitting the controlled accelerator pedal output signal to the control unit if a time during which the accelerator pedal touch sensor remains on is not longer than a first predetermined reference time and at least one of the engine rotation speed, the vehicle speed, and the degree of opening of the throttle valve increases, the pedal monitoring unit transmitting the accelerator pedal output signal to the control unit if the time during which the accelerator pedal touch sensor remains on is longer than the first predetermined reference time or none of the engine rotation speed, the vehicle speed, and the degree of opening of the throttle valve increases.

8. The pedal module of claim 7,
wherein the accelerator pedal comprises an accelerator pedal bracket, an accelerator pedal arm, and an accelerator pedal pad, and
wherein the accelerator pedal touch sensor comprises a tact switch disposed on the accelerator pedal pad.

9. The pedal module of claim 7,
wherein a warning signal is transmitted from the pedal monitoring unit to the control unit through a controlled area network (CAN) communication and is transmitted through hard wire from the pedal monitoring unit to the control unit if the time during which the accelerator pedal touch sensor remains on is not longer than the first predetermined reference time and at least one of the engine rotating speed, the vehicle speed, and the degree of opening of the throttle valve increases.

10. The pedal module of claim 7,
wherein the controlled accelerator pedal output signal is an idle signal.

11. The pedal module of claim 7,
wherein the accelerator pedal output signal is transmitted to the control unit without going through an engine control unit (ECU).

12. The pedal module of claim 7, further comprising a brake pedal;
wherein the pedal sensing unit further comprises a brake pedal touch sensor detecting touch on the brake pedal or an brake position sensor detecting a rotation angle of the brake pedal, and
wherein the pedal monitoring unit further receives at least one of information on the touching of the brake pedal from the brake pedal touch sensor and the rotation angle of the brake pedal from the brake position sensor, the pedal monitoring unit transmitting the controlled accelerator pedal output signal to the control unit if a time during which the brake pedal touch sensor remains on is longer than a second reference time and at least one of the engine rotating speed, the vehicle speed, and the degree of opening of the throttle valve increases or a time during which the brake pedal remains rotated is greater than a third predetermined reference time and at least one of the engine rotating speed, the vehicle speed, and the degree of opening of the throttle valve increases, the pedal monitoring unit transmitting the accelerator pedal output signal to the control unit if the time during which the brake pedal touch sensor remains on is not longer than the second predetermined reference time and the time during which the brake pedal remains rotated is not longer than the third predetermined reference time or none of the engine rotating speed, the vehicle speed, and the degree of opening of the throttle valve increases.

13. A method for controlling abnormal sudden acceleration of a vehicle, the method comprising:
determining by a processor that a driver is misoperating an accelerator pedal when a time during which force applied to the accelerator pedal exceeds a predetermined value is longer than a predetermined reference time; and
controlling by the processor an output of the accelerator pedal,
transmitting the controlled output of the accelerator pedal by the processor when the driver is determined to be misoperating the accelerator pedal.

14. The method of claim 13, further comprising
determining by the processor that a driver is not stepping on the accelerator pedal when the force applied to the accelerator pedal is less than another predetermined value,
transmitting the controlled output of the accelerator pedal by the processor when the driver is determined to be not stepping on the accelerator pedal.

15. The method of claim 13, further comprising
determining by the processor whether the accelerator pedal is normally operating or not,
transmitting the controlled output of the accelerator pedal by the processor when the accelerator pedal is determined to be not normally operating.

16. The method of claim 13, further comprising
determining by the processor whether the driver is stepping on a brake pedal or not,
transmitting the controlled output of the accelerator pedal by the processor when the driver is determined to be stepping on the brake pedal.

17. A method for controlling abnormal sudden acceleration of a vehicle, the method comprising:
determining by a processor whether a driver is stepping on an accelerator pedal or not;
determining by the processor that the vehicle is accelerating when at least one of an engine rotating speed, a vehicle speed, and a degree of opening of a throttle valve increases;
controlling by the processor an output of the accelerator pedal; and
transmitting the controlled output of the accelerator pedal by the processor when the driver is determined to be not stepping on the accelerator pedal and the vehicle is determined to be accelerating.

18. The method of claim 17, further comprising
determining by the processor whether the driver is stepping on a brake pedal or not,
transmitting the controlled output of the accelerator pedal by the processor when the driver is determined to be stepping on the brake pedal.

* * * * *